Dec. 19, 1933.  O. R. SWEENEY  1,940,612
PROCESS AND APPARATUS FOR ELECTROLYTIC
PRODUCTION OF CARREL-DAKIN SOLUTION
Filed May 5, 1931  3 Sheets-Sheet 1

INVENTOR
ORLAND R. SWEENEY

BY Ely Burrow

ATTORNEYS

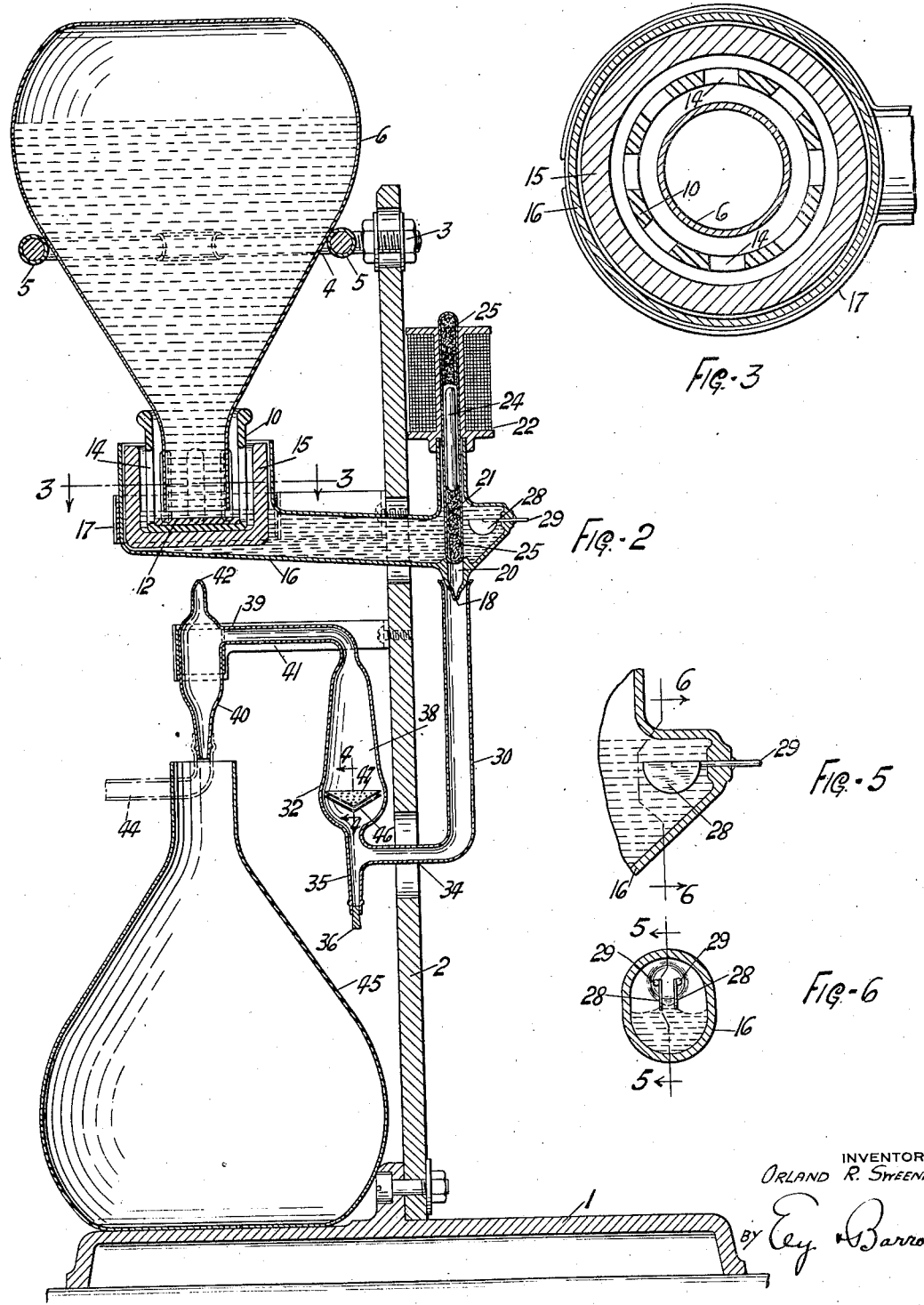

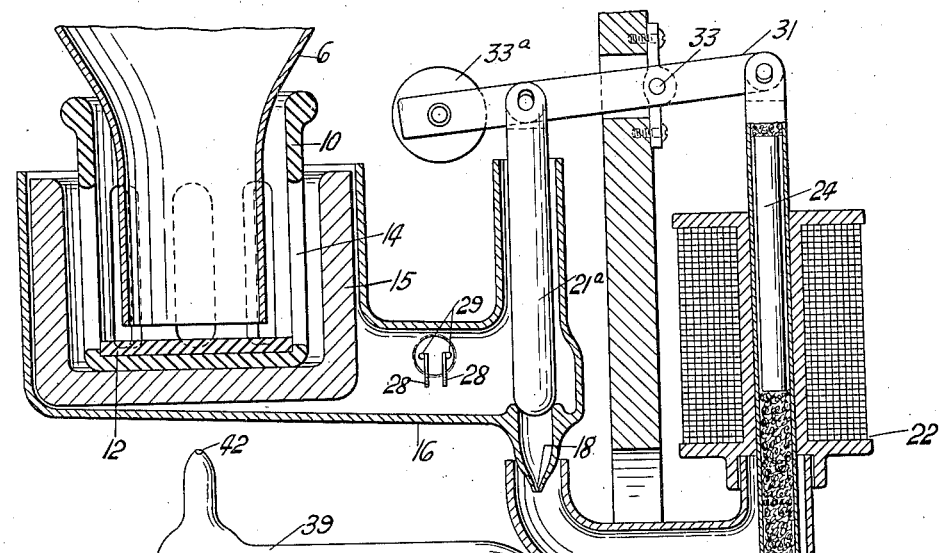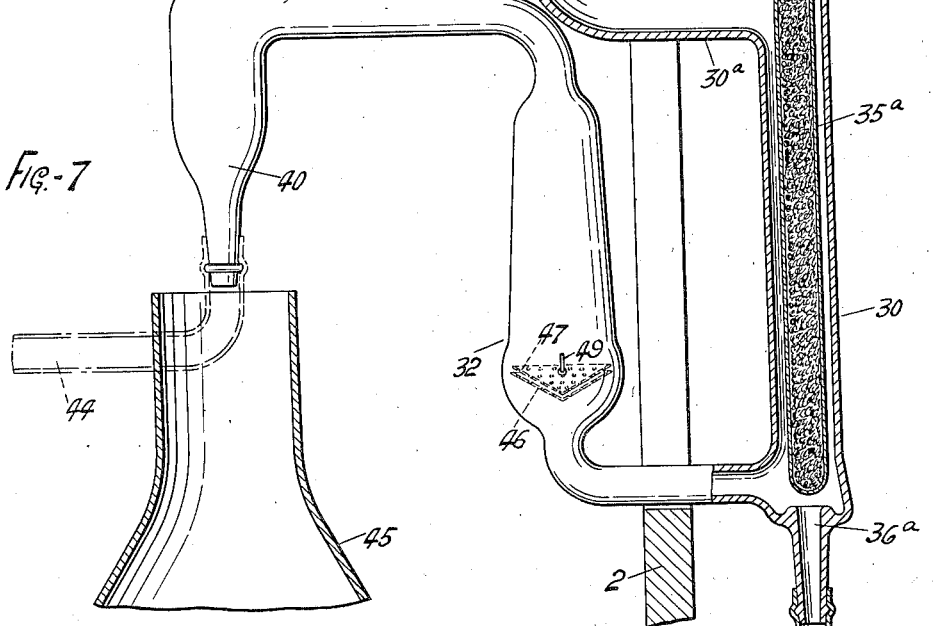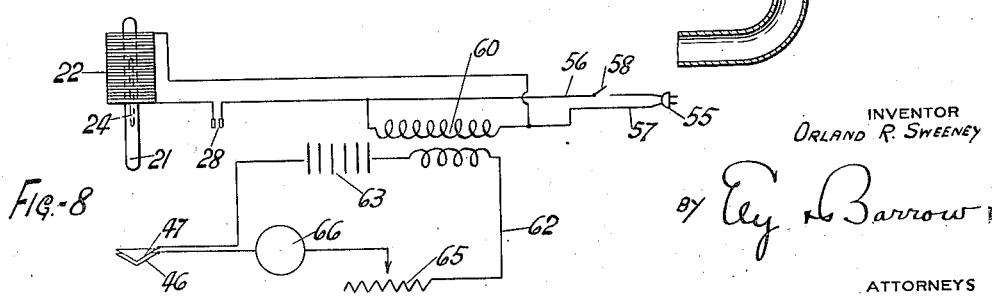

Patented Dec. 19, 1933

1,940,612

UNITED STATES PATENT OFFICE 1,940,612

PROCESS AND APPARATUS FOR ELECTROLYTIC PRODUCTION OF CARREL-DAKIN SOLUTION

Orland R. Sweeney, Ames, Iowa, assignor to Iowa State College of Agriculture and Mechanical Arts, Ames, Iowa Application May 5, 1931. Serial No. 535,153

16 Claims. (Cl. 204—59)

The present invention has for its object the production of an antiseptic hypochlorite solution known as "Carrel-Dakin" solution by new and improved apparatus and method, so that the solution is readily obtainable in fresh, pure condition. The especial purpose of the invention is to provide a method and convenient means by which this valuable antiseptic can be obtained in substantially pure condition and at any desirable concentration without the use of skilled or experienced operatives.

One of the objects of the invention is to provide a method and apparatus whereby sodium hypochlorite can be readily obtained by the simple act of closing an electrical current, the solution being delivered at a constant rate and of any desirable strength. This object is obtained by causing a salt solution to flow in a constant stream, during production of the solution, over electrodes which cause the chemical reaction by which the hypochlorite solution is evolved. This method of procedure permits the surgeon to obtain a supply of fresh, active, nascent hypochlorite at any time and in any degree of concentration adapted for surgical purposes by regulating the current density. The process of making the hypochlorite continues indefinitely as long as the salt solution flows past the electrodes.

A further object of the invention is to provide a new and extremely useful and valuable method by the practice of which antiseptic hypochlorite solution can be secured as easily as the turning on of an electric switch. By the process and apparatus here shown, the salt solution will begin to flow past the electrodes, the reaction will commence and the antiseptic solution will be delivered immediately upon the turning on of the current and continue while the current is flowing.

It is well known in the field of medicine and surgery that the work done by Drs. Carrel and Dakin in perfecting and making available antiseptic hypochlorite during the World War was an outstanding achievement. The discovery that sodium hypochlorite of concentration between 0.45 and 0.50 percent and of the requisite pH value was an antiseptic of the greatest value has contributed greatly to recent progress in this field.

The "Carrel-Dakin" solution, or what is more commonly known as "Dakin's solution," was prepared by these scientists by the reaction of sodium carbonate on a solution of bleaching powder, but inasmuch as antiseptic sodium hypochlorite is an extremely unstable substance and requires the greatest care in its preparation by the above method, the material had to be made by an experienced operative and stabilized by the addition of boric acid or other agents which were irritants and greatly reduced the efficiency of the solution. Furthermore, it was impossible to prevent decomposition of the solution with resulting loss of efficiency.

It has also been known that hypochlorite of sodium could be obtained by passing chlorine gas through a solution of sodium carbonate, but this reaction requires accurate control of the chemicals. Sodium hypochlorite has also been obtained by electrolysis of salt solutions in vats or cells. The above processes have been used for the manufacture of disinfectants where exact compositions and properties are non-essential, and in the former processes the resultant products have been uncertain and inadaptable for surgical purposes except by very careful supervision in their manufacture.

All of the above methods have had disadvantages which greatly restricted the use of this very valuable antiseptic and have interfered with its adoption and use for surgical purposes. The present invention has as its object and as a practical result, a method and apparatus whereby the antiseptic hypochlorite solution can be easily and simply obtained, fresh and active in a nascent form, in the exact concentration and pH value required and without attention or experience on the part of the surgeon or nurse. It also has the advantage that the solution can be produced continuously and at any chemical concentration so that wounds or incisions can be irrigated by a steady dropping of the antiseptic.

The value of the invention is very great when it is considered that by the method and apparatus herein described, fresh, active, nascent and highly efficient sodium hypochlorite may be obtained from a solution of sodium chloride upon the turning of a switch. This renders available for immediate use, the antiseptic solution at its highest efficiency and without any loss of efficiency due to standing or to the use of preservatives.

In the production of the solution, the well known chemical reaction arising from the electrolysis of a salt solution is employed. This reaction is as follows:

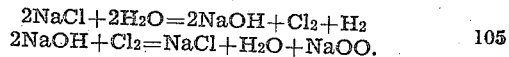

$$2NaCl + 2H_2O = 2NaOH + Cl_2 + H_2$$
$$2NaOH + Cl_2 = NaCl + H_2O + NaOO.$$

It will thus be seen that the nascent chlorine reacts with the sodium hydroxide to produce the sodium hypochlorite solution and hydrogen. The sodium chloride which remains in the solution is in itself a mild antiseptic and aids in the results. By the employment of a 2½% solution of sodium chloride and a direct electrical current of approximately 6 v. and 3.2 amp., a hypochlorite solution having the desired concentration between 0.45 and 0.50 and of a pH value between 8.5 and 10 will be obtained with a flow rate of 10 cc. per minute, when using the cell to be described later. The exact concentration may be varied either by varying the percentage of the salt solution or by varying the current, and this latter fact is utilized in the practical use of the apparatus to obtain the desired concentration. In order to assure that the proper pH value is obtained, a small amount of a buffer agent, such as sodium acid carbonate may be added to the original salt solution, for example, approximately .2% may be employed for this purpose.

It will be appreciated that while present knowledge indicates the concentration desirable for antiseptic purposes as between 0.45 and 0.50, experience or later knowledge may indicate that a greater or less concentration is desirable and it is not intended that the invention should be limited to exact values and proportions as set forth, but may be varied with the skill and knowledge of those familiar with the art. It will also be understood that the apparatus shown herein is that best known at the present time, but it may be modified and improved without in any way depriving the invention of its proper scope to cover and protect the same.

It will also be understood that the process and apparatus herein described is particularly adapted and intended for the production of antiseptic hypochlorite for medicinal and surgical purposes and is not adapted, designed or suitable for the production of hypochlorite for commercial purposes as it is unsuited for that purpose. The invention is not limited to the production of sodium hypochlorite as other hypochlorites, such as potassium hypochlorite, have antiseptic properties as is well known. The production of sodium hypochlorite is stressed herein and the description will be addressed thereto, but this is not to be taken as limiting the invention to that exact substance.

I have heretofore filed an application Serial No. 455,743 on May 26, 1930, for a somewhat similar process and apparatus and the present application illustrates the latest improvements and developments thereon, and is intended to be a continuation in part of such application.

The process will now be described in detail in connection with the improved form of apparatus illustrated herein, the same being subject to modifications and alterations without departing from the basic features of the invention. The apparatus illustrated is such as may be used in a hospital or operating room, requiring nothing additional other than a source of electrical energy. It is specifically illustrated for use where the ordinary alternating current, such as used in lighting circuits, is available, it being obvious that with suitable modifications the apparatus may be employed with a source of direct current.

In the drawings as illustrated:

Figure 2 is a vertical section through the apparatus on the line 2—2 of Figure 1;

Figure 3 is an enlarged section through the top of the solution conduit on the line 3—3 of Figure 2;

Figure 5 is an enlarged detail of the safety device on the line 5—5 of Figure 6;

Figure 6 is a section thereof on the line 6—6 of Figure 5;

Figure 7 is a sectional view through a modified form of the device by which a fresh solution is assured; and Figure 8 is a detail view of a representative circuit such as employed with a source of alternating current.

Figure 1:
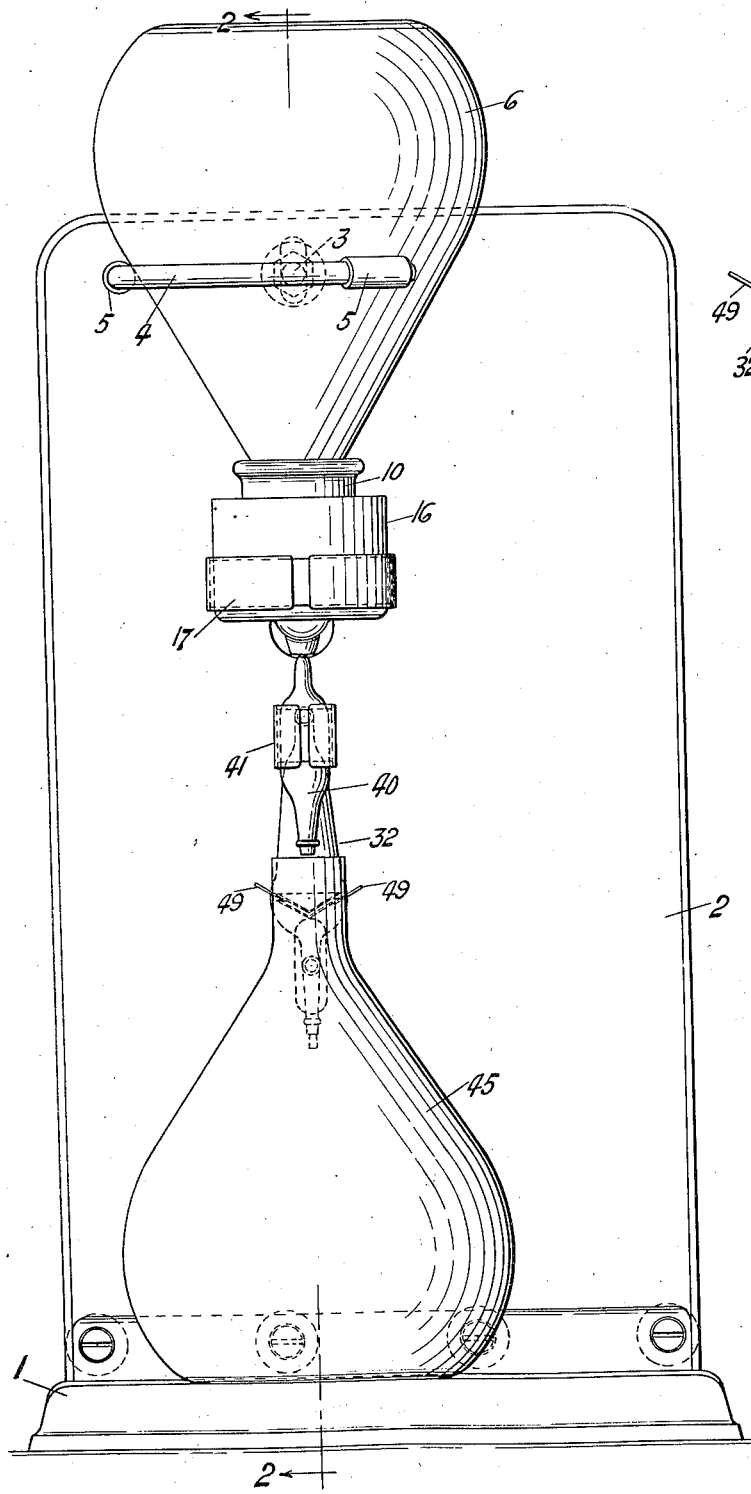
Figure 1 is a front elevation of a simple type of apparatus as designed and perfected for the purpose.
Figure 4:
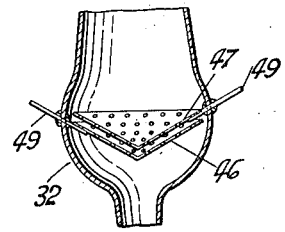
Figure 4 is an enlarged vertical section through the electrodes on the line 4—4 of Figure 2.

The improved apparatus comprises a base or stand 1 which is preferably portable so that the apparatus may be moved about and placed where needed, this being a valuable feature where irrigation of the wound or incision is employed, the surgeon placing the apparatus near the patient to permit the application of the fresh hypochlorite solution to the wound.

From the base rises a panel 2 which supports the various elements of the apparatus. On the upper portion of the panel is located the vertically adjustable bracket 3 on which is carried the flask support 4 in the form of a loop with rubber gaskets 5 thereon at intervals. The loop is designed to receive the inverted flask or reservoir 6 containing the salt solution specified or desired, the mouth of the flask being received in a cup 10 and supported slightly above the base of the cup to permit the discharge of the solution.

The cup 10 is for the purpose of retaining the salt solution during the inversion of the flask and is designed to drop slightly as shown when the flask is in place, the elevation of the flask through the means of the adjustable support determining the "head" of the solution. The cup, usually of hard rubber having a soft rubber gasket 12 placed therein, is provided with the lateral openings 14 through which the salt solution is discharged into a filter 15 of any approved type. It is essential that all foreign substances be removed, otherwise the delicate portions of the apparatus may become clogged.

The filter is seated in the mouth of the glass trap conduit, indicated as a whole by the numeral 16, and supported on the panel by a clamp bracket 17. The main stem of the conduit is inclined downwardly, passing through the panel and leading to the discharge spout or outlet 18. This outlet is accurately calibrated so as to permit flow of an exact amount of the salt solution which is governed and predetermined with respect to the current density so as to obtain the requisite concentration of the hypochlorite solution. With the current density given above, a flow of 10 cc. per minute will result in a hypochlorite solution of the requisite concentration and produced at the rate of 7½ cc. per minute. The rate of flow may be varied from the above, as found by experience, by raising or lowering the bracket 3.

Above the outlet 18 is the channel or passageway 20, the upper end of which is closed by the hollow glass valve member 21 which, when lowered in position, closes the outlet and which is designed to be raised by the solenoid 22 secured to the rear of the panel. Interiorly of the valve is located the soft iron core piece 24, which is located in insulating packing 25. The core may have a certain freedom of movement within the packing so as to exert a slight impulse to the valve which assists in lifting it. It will be noted that the core piece is removed from the pool within the conduit, the reason being that the heat generated by the magnetic action is sufficient to affect the reactions unfavorably, it being advisable to prevent the liquid from heating greatly above blood temperatures, otherwise the results will not be sufficiently accurate for the purposes of the invention.

Located within the conduit below the normal level of the salt solution are the two conductor plates 28 which are designed to be placed in the main circuit and operate as a safety device to shut off the current when the liquid in the conduit falls below their level. As will be described hereinafter, these plates are in the main alternating circuit so that no electroylsis will take place at this point. As shown, the contact plates are located in close proximity and are carried upon the leads 29. They are placed in vertical position as shown so that the current will be shut off instantaneously and without arcing or sputtering. The surface tension of the liquid on the plates and between the plates, which is illustrated in Figure 6, insures an instantaneous break when the level of the liquid in the trap or conduit falls below the points.

The solution from the outlet 18 falls into the vertical leg 30 or inlet of the main cell, indicated in general by the numeral 32. This cell is made of a suitable glass, the better known forms of silica glass being preferred because of their neutral properties. That form of glass known as "hard" glass is preferred for the purpose.

From the vertical leg 30 is extended a horizontal tube 34 which passes through the panel and discharges into the lower end of the main cell body. It will be observed that the cell tapers upwardly as shown for the purpose of insuring that the secondary reaction described above takes place within the moving stream which is agitated by the upwardly moving bubbles of hydrogen, such agitation being confined to the stream above the electrodes. Below the discharge point is the drain or outlet 35 closed by a stopper 36 through which solution remaining in the cell may be removed, insuring fresh hypochlorite at the next run, should the cell stand unused for a considerable period.

The solution flows into the electrolysis chamber 38, which is preferably in the form shown, being enlarged around the electrodes to be described. The cell extends above the electrodes for a sufficient distance so that the secondary reaction necessary to form the hypochlorite will take place. The cell is provided with the horizontal tube or channel 39 which empties into the enlarged discharge chamber 40 supported in a clamp bracket 41. The upper end of the chamber 40 is provided with the minute passage 42 through which the hydrogen gas will be discharged.

It will be observed that the hydrogen gas will collect in the liquid and form bubbles which rise through the stream above the electrodes and traveling along the tube 39, will be released at the mouth of the tube, the hypochlorite being thus discharged in slugs or large drops which give the intermittent flow found so valuable in irrigation of wounds or incisions. For irrigating purposes, a flexible tubing 44 may be connected to the discharge 40 so that the hypochlorite may be conducted to the point where it is to be applied. A flask 45 may be placed on the stand to receive the hypochlorite solution. The discharge chamber 40 is so designed that the bubbles of gas, due to lessened surface tension, discharge freely, thus preventing a pumping action in the cell. This insures a steady passage between the electrodes and prevents secondary electrolysis.

The electrodes referred to are located in the enlarged portion of the cell and are indicated by the reference numerals 46 and 47, the former being the anode and the latter the cathode. These electrodes are the result of considerable investigation and experimentation, and, as described, are the best known form of electrode for the purpose, although it is possible that they may be improved, and the invention is not limited to the exact design or composition as will be set forth.

As shown in the preferred form of the invention illustrated, each electrode consists of a cone-shaped disk, the disks being nested within one another as shown with the points downwardly and are provided with numerous fine openings. The electrodes are supported by the platinum leads 49 set in the wall of the cell. The spaced, perforated electrodes in their conical form permit the free passage of gas liberated at the poles, so that the nascent hydrogen and chlorine may pass freely into the body of the solution surrounding and above the electrodes.

A number of substances have been tried for the electrodes, but many have been found unsuitable for the reason that they tend to decompose and discolor or injuriously affect the hypochlorite solution. After considerable research, it has been found that a lower electrode or anode of pure rhodium and an upper electrode of platinum with 10% of iridium will give exact and almost perfect results, decomposition of the electrodes and discoloration or injurious effects upon the solution are obviated. It has also been found that this combination of electrodes due to the low "over-voltage" at the surface of the rhodium is especially efficient for the purpose, as most of the electrical energy is consumed in promoting the chemical reaction and a very small proportion goes into heat. This is particularly advantageous for the reason that higher temperatures cause or promote a decomposition of the sodium hypochlorite. By the presence of electrodes which generate relatively low temperatures the purity of the resultant product is assured, even at high room temperatures. The temperature of the resultant product is uniformly below a temperature at which the sodium hypochlorite readily tends to decompose. The invention, therefore, includes this combination of electrodes as one of its features.

The electrical circuit will now be described, it being noted that the current for the apparatus is obtainable, in the form illustrated in Figure 8, from an ordinary alternating current supply such as usually found in electric lighting circuits. A plug is shown, for example, at 55, the main lines 56 and 57 leading therefrom, and a switch 58 is illustrated. In one of these lines is placed the safety contact plates 28 so that when the solution is about to the point of exhaustion the operation of the device will cease. This prevents the results being spoiled by inattention on the part of the operator, and while not essential is a valuable refinement of the apparatus. It is used only with an alternating current as explained to prevent electrolysis in the conduit, and in event direct current only is available the machine may be modified so that any float device may be employed to break the circuit.

The lines 56 and 57 lead to the solenoid 22 so that when the circuit is closed for operation, the valve 21 will be raised and the flow of salt solution will commence. On the line is located the transformer 60 for the secondary circuit 62 in which is located the rectifier shown diagrammatically at 63. The current in circuit 62 is direct current and is supplied directly to the electrodes 46 and 47. A variable resistance 65 is located in the secondary circuit so that the current may be varied for the purpose of securing the different concentrations of hypochlorite. An ammeter 66 is also located in the secondary circuit and this may be calibrated in terms of solution density, so that the operator may secure the desired concentration of solution by direct reference to the ammeter reading.

It will be seen that an extremely practical and yet simple and easily operated unit has been devised for the production of antiseptic hypochlorite. The strength of the hypochlorite solution may be varied by varying the current density through the variable resistance and as this is easily accomplished, the other factors remaining constant, the apparatus is capable of delivering hypochlorite solution of the desirable concentration without error.

The operation will be readily understood from the description which has been given, it being noted that at the moment the switch 58 is closed and the current begins to flow, the valve will be opened and the solution will flow past the electrodes at the requisite speed and a continuous production of the hypochlorite will be obtained. The advantages of obtaining fresh, nascent, active antiseptic hypochlorite are obvious to those familiar with the surgical field, and it is believed that an extremely valuable process and apparatus have been evolved.

For the cell to function properly a salt solution of proper concentration must flow continuously at a proper uniform rate, past a single set of electrodes across which the correct amount of current is flowing. The proper concentration of salt solution is obtained by weighing out the correct amount of salt which is added to the storage flask 6. The flask is then filled with pure water. This gives the proper concentration. For example 50 grams of salt are weighed out and poured into the 2 liter storage flask 6. On filling with water a 2.5 percent salt solution results.

In order to simplify this part of the operation it is proposed that the manufacturer of the cell, or supply houses, supply packages of the salt containing the proper weight, or that tablets be supplied containing the proper amount. Saline tablets which, when dissolved in the proper amount of water, give the desired salt concentration are now regularly supplied to the medical profession by supply houses. Since it is desirable, usually, to add a small percent of sodium bi-carbonate to the salt solution as a "buffer" to insure the proper pH value, this bi-carbonate is incorporated in the salt package or tablet.

After the salt solution is prepared the flask is inverted in the salt cup 16, air enters the flask and salt solution runs out until the level in the cup reaches the lip of the flask. Flow ceases from the flask until the salt drains down slightly when another air bubble enters the flask delivering to the cup more salt solution. By this means a practically constant head is maintained in 16; and therefore a constant delivery results at 18. When the valve 21 is closed the delivery system remains static indefinitely.

The above device renders the operation of making the solution so simple as to require no experience.

In action the chlorine from the salt solution is deposited at the bottom electrode or anode, from which it at once sweeps upward through the cell. The sodium from the salt deposits on the upper electrode or cathode. Here, because of the presence of water, it forms sodium hydroxide and hydrogen gas, which latter escapes upward through the cell. The chlorine thus meets the sodium hydroxide above the electrodes and, due to the shape of the cell, is commingled thoroughly with it, producing the hypochlorite. The agitating effect of the hydrogen gas insures thorough mixing. Should the flow of salt solution become irregular or should any "pumping" action occur, or should convection currents occur near the electrodes, the hypochlorite will be carried back between the electrodes and since it is an electrolyte it would be electrolyzed into secondary, undesirable products, and the concentration and pH of the solution would be erratic. These undesirable results are obviated by the design of the apparatus as shown. Inventors who in the past have developed cells which electrolyzed a batch of salt solution between electrodes until the concentration seemed correct have failed to produce satisfactory solutions due to this re-electrolysis.

In the device shown above the salt solution passes continuously between the two electrodes. The sodium hydroxide is produced at the surface of the upper electrode and is continuously carried away by the slow uniform stream of salt solution running through the cell. The chlorine gas which is formed at the bottom of the electrodes passes up through the solution much quicker, and by the device developed, reacts immediately out of the zone of electrolysis, but within the cell. This feature differentiates the cell from a considerable group of cells which make the chlorine and caustic soda separately and then mix them in a separate compartment.

It will thus be noted that for accurate and positive results, numerous precautions have been taken which insure the production of this highly sensitive solution.

In the operation of the above cell, it will be noted that the transformed current is rectified, using for this purpose the so-called copper oxide rectifier or dry rectifier, but I have satisfactorily used wet rectifiers, such as the tantalum rectifier. Any other type of rectifier may be employed in the circuit. Those skilled in this field know that a small amount of A. C. may leak through the rectifying system. The effect of this is to slightly raise the temperature of the solution due to the resistance which the solution offers to the alternating current.

Since the A. C. does not electrolyze the solution then its effect is a very slight raise in temperature of the solution. Furthermore, the rectified current is made up of a series of pulses which vary in voltage from zero to maximum, or as the electrical engineer expresses it, "the characteristics of the current are expressed by the upper half of the sine curve." Since decomposition in the cell does not take place until the proper voltage is reached, the cell must act not only as an electrolyzing means, but as a choke. The result of this is that the temperature of the solution as delivered is slightly raised. Under the conditions described in the illustration above, that is using a 2.5% salt solution, 6 volts, and 3.2 amp., the temperature of the effluent when operating at ordinary room temperature will be about 42° C. The blood temperature or body temperature is approximately 37° C.

Generally speaking the slightly warm solution will be quite pleasant when applied to the wound. For that reason the cell is quite satisfactory and even desirable as designed. In case the solution does not drop directly, as produced, upon the wound but is collected in a vessel for future use, the solution rapidly cools to room temperature and therefore the temperature effect is of little importance. However, if the surgeon desires the temperature to be closer to blood temperature, I have found that by interposing after the rectifier a series of choke coils and condensers, that the resulting solution under the above conditions will have a temperature of approximately 37° C. Accordingly I have found it advantageous in certain connections to impose into the circuit a filter system made up of choke coils and condensers in order that the temperature of the cell may be kept lower.

It is obvious that if preferred a motor generator set, or rotary converter with proper characteristics may be used instead of the rectifier.

The form of apparatus shown in Figure 7 is a modification by which the discharge of the solution within the cell is assured at the end of a run. Except as especially noted, parts bear like reference numerals with the main drawing.

In this form the leg 30 of the cell is provided with a branch 30ª which is below the discharge 18 of the conduit 16. The valve 21ª is carried upon the end of a lever 31 pivoted at 33 and provided with a counterweight 33ª. A second valve 35ª pivoted on the lever 31, extends through the tube 30 and is located over the discharge point 36ª at the lowermost point in the cell. The core 24 is located in the valve 35ª and is drawn downward in the solenoid 21 when the current is applied. Slotted connections between the lever 31 and the valves 21ª and 35ª insure seating of the valves without danger of breakage. By this means the discharge 36ª is opened when the device is shut down simultaneously with the closing of the valve 21ª and draining of the solution is assured. In this form the safety contact plates 28 are located in the conduit 16 as shown.

Various modifications and refinements may be made, all within the scope of the invention as set forth in the claims hereto appended. It will be understood that when "sodium" is used in the claims, elements forming soluble hypochlorites under the same conditions may be substituted.

What is claimed is:

1. In an apparatus for the production of an antiseptic solution of sodium hypochlorite from a solution of sodium chloride, comprising a source of said salt solution, a valve controlled calibrated passage leading therefrom, an electrolytic chamber in the passage, electrodes therein, a circuit having a switch therein for controlling the passage of current across the electrodes, and electrically operated means to control the valve in timed relation to the operation of the switch.

2. An apparatus for the continuous production of an antiseptic hypochlorite solution from a flowing stream of salt in solution, comprising a conduit, an electrolytic chamber tapering upwardly to which said conduit delivers the salt solution, a pair of electrodes in enlarged portion of the chamber, a discharge pipe above the electrodes, an enlarged discharge chamber to which the pipe delivers, having a vent in the upper portion thereof, and a discharge opening in the lower portion thereof.

3. In an apparatus for the production of an antiseptic hypochlorite solution, the combination with a gravity feed for a solution of sodium chloride, a valve for controlling the feed of the solution, a cell to receive the flowing stream, a pair of electrodes within the cell, a valve controlled drain for the cell, and means for closing the drain and opening the valve simultaneously with the closing of the circuit to the electrodes.

4. In an apparatus for the production of an antiseptic hypochlorite solution, the combination with a gravity feed for a solution of sodium chloride, a valve for controlling the feed of the solution, a cell to receive the flowing stream of the solution, a pair of electrodes within the cell, means for opening the valves simultaneously with the closing of the circuit to the electrodes, and a safety device for breaking the circuit upon depletion of the solution.

5. In an apparatus for the production of an antiseptic hypochlorite solution, the combination with a gravity feed for a solution of sodium chloride, a valve for controlling the feed of the solution, a cell to receive the flowing stream, a pair of electrodes within the cell, a valve controlled drain for the cell, means for closing the drain and opening the valve simultaneously with the closing of the circuit to the electrodes, and a safety device for breaking the circuit upon depletion of the solution.

6. In an apparatus for the uses and purposes set forth, a cell, means for causing a stream of a solution of an electrolyte to pass upwardly through said cell and a pair of spaced conical electrode disks nested within one another with the axes thereof substantially vertical and having perforations for the passage of liberated gas, said cell and said electrodes being so constructed and arranged as to discharge the products of electrolysis without further electrolysis of said products.

7. An electrolytic apparatus for the production of sodium hypochlorite from a salt solution comprising an anode of rhodium and a cathode of platinum alloyed with iridium.

8. The process of producing an antiseptic solution for the purposes set forth comprising passing a sodium chloride solution of a predetermined concentration and at a uniform rate upwardly past a single set of spaced electrodes in a continuous stream and passing an electric current across such electrodes, removing all of the products of the electrolysis in the direction of the stream, whereby a solution of sodium hypochlorite of the required concentration is produced and carried by the stream beyond the electrodes.

9. The process of producing antiseptic sodium hypochlorite for the purposes set forth, consisting in passing a sodium chloride solution of a predetermined concentration in a continuous, uniform stream with a constant head past a single set of spaced electrodes having the property of maintaining a temperature within the stream below which the sodium hypochlorite will not readily decompose, the products of the electrolysis passing the electrodes in the direction of the stream, whereby a solution of the sodium hypochlorite is produced and is carried beyond the zone of electrolysis.

10. The process of producing antiseptic sodium hypochlorite for the purposes set forth consisting in passing a sodium chloride solution of a predetermined concentration in a continuous, uniform stream with a constant head past a single set of spaced electrodes consisting of a rhodium anode and a platinum-iridium cathode, the products of the electrolysis passing the electrodes in the direction of the stream, whereby a solution of the sodium hypochlorite is produced and is carried beyond the zone of electrolysis.

11. The process of producing antiseptic sodium hypochlorite for the purposes set forth consisting in passing a sodium chloride solution of a predetermined concentration in a continuous, uniform stream with a constant head through a single set of spaced perforated electrodes having the property of maintaining a temperature within the stream below which the sodium hypochlorite will not readily decompose, the products of the electrolysis passing the electrodes in the direction of the stream. whereby a solution of the sodium hypochlorite is produced and is carried beyond the zone of electrolysis.

12. The process of producing antiseptic sodium hypochlorite for the purposes set forth from a solution of sodium chloride consisting in passing said solution past a single set of spaced electrodes in a continuous stream at a uniform rate and passing an electric current across such electrodes, all of the products of electrolysis being removed and carried by the stream in the direction of flow beyond the electrodes so that secondary electrolysis is prevented.

13. The process of producing antiseptic sodium hypochlorite solution for the purposes set forth comprising passing a continuous stream of sodium chloride solution of predetermined concentration through an upright U-shaped passage, maintaining a uniform head on the solution in one arm and electrolyzing the solution in the other arm as it moves upwardly with the stream by a single set of spaced electrodes.

14. An apparatus for the production of antiseptic hypochlorite solution for the purposes set forth comprising an upright U-shaped tube, means for maintaining a uniform head upon a sodium chloride solution in one arm of the tube, and a set of electrodes in the other arm of the tube, located below the level of the head.

15. An apparatus for the production of antiseptic hypochlorite solution for the purposes set forth comprising an upright U-shaped tube, means for maintaining a uniform head upon a sodium chloride solution in one arm of the tube, and a single set of electrodes consisting of a rhodium cathode and a platinum iridium anode in the other arm of the tube, located below the level of the head.

16. An apparatus for the production of antiseptic hypochlorite solution for the purposes set forth comprising an upright U-shaped tube, a storage supply for sodium chloride above the tube, a controlled outlet from the supply to admit the sodium chloride solution into one arm of the tube at a fixed rate, a pair of electrodes in the other arm of the tube below the level of the discharge thereof whereby the solution moves in a continuous stream at a uniform rate upwardly past the electrodes, and all the products of electrolysis move immediately beyond the zone of electrolysis.

ORLAND R. SWEENEY.